L. D. SHANNON.
ROBE ROLLER.
APPLICATION FILED JAN. 19, 1917.
1,238,581.
Patented Aug. 28, 1917.
2 SHEETS—SHEET 1.
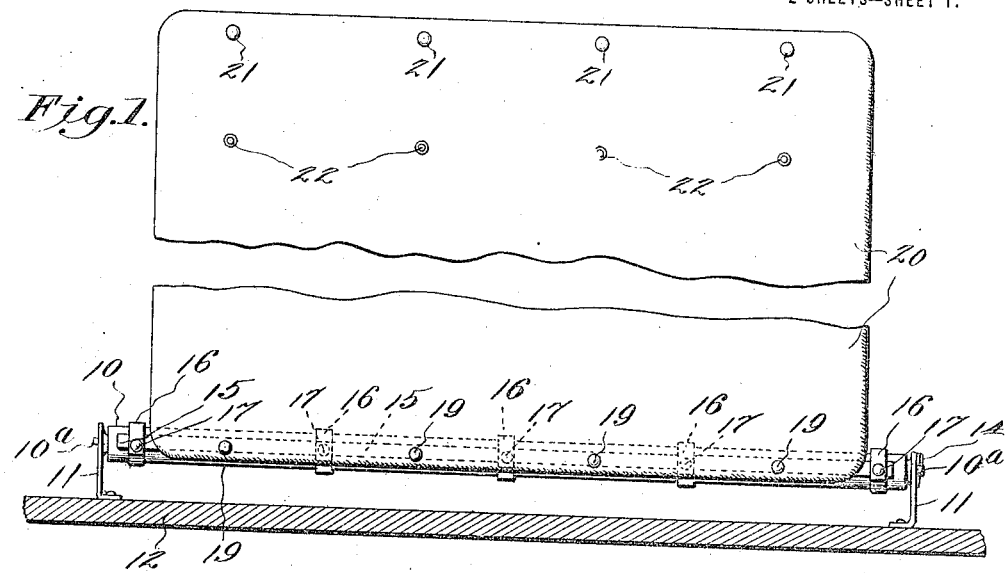
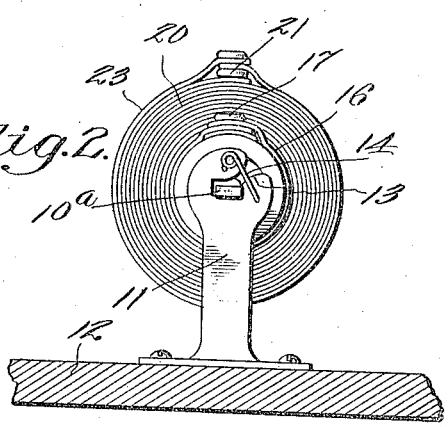
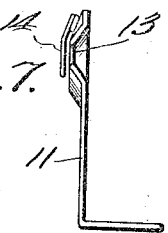
WITNESSES
INVENTOR
Lloyd Davie Shannon
BY Victor J. Evans
ATTORNEY

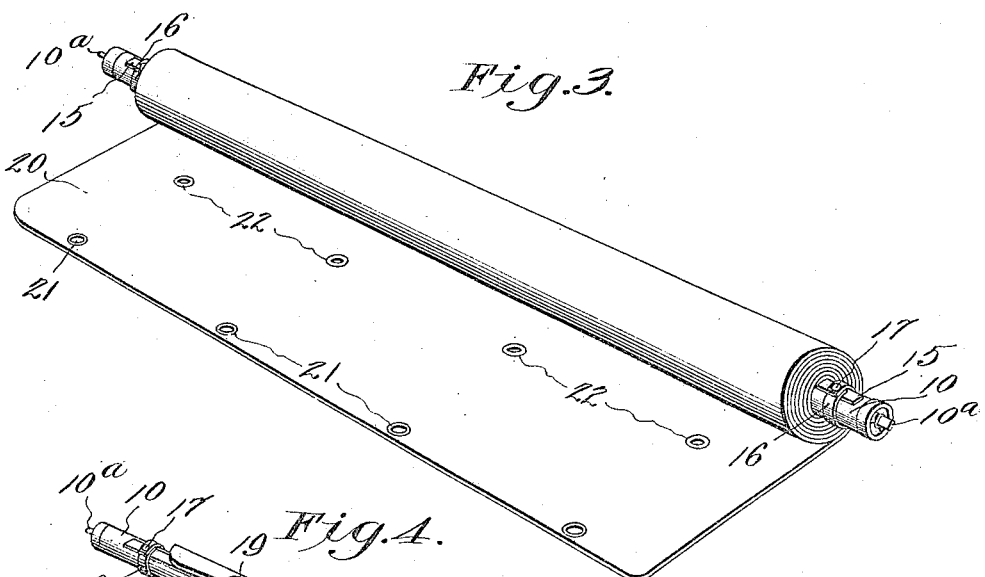

UNITED STATES PATENT OFFICE.

LLOYD DAVID SHANNON, OF BINGHAMTON, NEW YORK.

ROBE-ROLLER.

1,238,581.  Specification of Letters Patent.  Patented Aug. 28, 1917.

Application filed January 19, 1917. Serial No. 143,379.

*To all whom it may concern:*

Be it known that I, LLOYD DAVID SHANNON, a citizen of the United States, residing at Binghamton, in the county of Broome and State of New York, have invented new and useful Improvements in Robe-Rollers, of which the following is a specification.

This invention relates to means for attaching lap robes to vehicles.

The object of the invention is the provision of means for the attachment of lap robes to vehicles, in order that they may always be within convenient position for use and when not in use will be so arranged as to be out of the way of the occupants of the vehicle.

Another object of the invention is to provide means for removably securing the robe in position, in order that either a heavy or a light robe may be used as the condition of the weather may require.

A still further object is to provide means whereby the robe may be automatically wound upon a spring roller, so as to avoid the trouble and delay occasioned by manually winding the robe, means being carried by the curtains for securing the end of the robe when it is in a rolled condition.

Still another object is to provide means for removably mounting the roller within brackets positioned within the vehicle, in order that the said roller may be removed and stored when not in use.

With the above and other objects in view the invention consists of the following novel combination and arrangement of parts, hereinafter more fully described, illustrated in the accompanying drawings and pointed out in the claim hereto appended.

In the drawings;

Figure 1 is a cross sectional view through a portion of the vehicle illustrating the invention in position therein the robe being shown in its unrolled condition;

Fig. 2 is a longitudinal sectional view through a portion of the floor of the vehicle, showing the manner of mounting the roller and also showing the robe tightly rolled upon the same with its protecting cover thereon;

Fig. 3 is a perspective view of the roller with its robe in position thereon, shown removed from the vehicle, the protecting cover being removed from the robe and the said robe being shown partly unrolled;

Fig. 4 is a detailed perspective view of the roller and a portion of the robe, the said robe being shown as partly attached;

Fig. 5 is a detailed perspective view of the movable longitudinal attaching strap;

Fig. 6 is a detail view of the transverse strap; and

Fig. 7 is a detailed view of one of the roller brackets, illustrating its spring closed entrance slot.

Referring in detail to the drawings, like characters of reference denote corresponding parts.

In the practical form of the invention herein illustrated, there is employed a spring roller 10 of the construction usually used for window shades. This roller includes end bearings 10$^a$, which are supported in brackets 11 secured to the floor 12 of the vehicle. The brackets 11 are of the usual construction, except one of them which is formed with an entrance slot 13 and is provided with a spring 14 across the same in order that the end of the roller may be removably positioned therein.

Removably secured to the roller 10 is a longitudinal strip 15 in the form of a strap, the said strap being positioned upon the roller by means of a plurality of transversely arranged short straps 16, which are provided with snap buttons 17 in order to secure them upon the roller. The straps 16 fit tightly around the roller and the strap 15 and are arranged to securely hold the said strap 15 in position. Secured at spaced intervals throughout the length of the strap 15 are male members of snap buttons 18, these members being adapted to engage the female members 19 of the buttons which are correspondingly spaced along one edge of the robe 20. This robe extends practically throughout the length of the pole and when in position thereon is capable of being used as a lap robe and when not in such use may be automatically wound upon the roller so as to be out of the way of the occupants of the vehicle. By removably securing this robe upon the roller in the manner shown, it may be removed and a lighter or a heavier one substituted to suit the conditions of the weather. If desired the robe and roller may be entirely removed from the vehicle, by disengaging the said roller from its brackets. Arranged along the edge of the robe opposite the edge attached to the roller, are the female members 21 of snap buttons similar to those previously described, the male members 22 of these buttons being secured to the robe in such position as to permit of the fastening of the free end of the robe in its rolled up condition.

If desired there may be provided a cover or case for the robe, this cover being indicated at 23, the said cover being provided with snap buttons after the manner of those previously described.

The right is reserved to make such changes in the form, proportion and minor details of the invention as will fall within the scope of the appended claims.

Having described the invention, what I claim is;

The combination with a spring roller, of a robe, a strap arranged longitudinally of the roller, transversely arranged straps for removably securing the longitudinal strap to the roller, fastening devices carried by said longitudinal strap and said robe for removably securing the robe to the roller and snap buttons carried by the robe to provide means for fastening the end when in a rolled condition.

In testimony whereof I affix my signature.

LLOYD DAVID SHANNON.

Copies of this patent may be obtained for five cents each, by addressing the "Commissioner of Patents, Washington, D. C."